UNITED STATES PATENT OFFICE.

JEAN JACQUES MAGNE, OF LES LILAS, NEAR PARIS, FRANCE.

FLUID INK.

SPECIFICATION forming part of Letters Patent No. 260,583, dated July 4, 1882.

Application filed August 23, 1881. (No specimens.) Patented in France August 24, 1880, No. 138,392, and August 23,1881, No. 144,495; in Belgium August 24, 1881, Nos. 55,540 and 55,541; in England August 29, 1881, No. 3,762; in Germany September 9, 1881, No. 17,515; in Italy September 30, 1881, XXVI—383; in Canada October 24, 1881, No. 13,595; in Luxemburg November 18, 1881, No. 169; in Spain December 20, 1881, No. 2,079; in Portugal January 25, 1882, No. 725; in Sweden February 1, 1882, and in Austria-Hungary March 11, 1882, No. 8,256 and No. 1,694.

*To all whom it may concern:*

Be it known that I, JEAN JACQUES MAGNE, of Les Lilas, near Paris, France, have invented a certain useful Composition of Matter for Use as a Fluid Ink, of which the following is a full, clear, and exact specification.

The object of my invention is to produce a fluid ink of any desired color, which in use will be practically ineffaceable, and will be unchangeable under the action of light, water, and acid vapors, and from which ink impressions of the original lines, sketches, or autographies may be taken by pressure upon stone or metal plates without injury to the said original autographies, as will be hereinafter more fully described.

My improved ink is composed of albumen, bichromate of an alkali, (potash, ammonia, or soda,) ferrocyanide of potash, and any desired neutral coloring substance—such as aniline gallate or tannate of iron, &c.—and water sufficient to give the desired fluidity. The quantities of salts and albumen may vary; but the following is my preferred formula: I first make a mixture of two parts of bichromate of potash, soda, or ammonia, and one part of ferrocyanide of potash, dissolved in from three to four times as much water as the quantity of albumen to be used. I then make a second mixture of equal parts of albumen and water. Both these mixtures are then mixed together in a single solution, the proportion of salts being preferably about six one-hundredths ($\frac{6}{100}$) of the whole solution, to which I then add a suitable quantity of any neutral soluble coloring-matter, and the ink is ready for use.

This ink may be used upon material for making sketches, drawings, or other autographies, will resist obliterating action of light, water, and acid vapors, and is therefore practically unchangeable and permanent. The original lines or traceries may be inked over, on paper prepared as elsewhere described, with any suitable fatty ink, and when subjected to pressure to transfer the said fatty ink to wood, metal, stone, or other suitable printing blocks or plates for use in obtaining duplicate prints of the original, the original will be in no wise injuriously affected by the transfer-ink laid thereon or the pressure applied, but will retain its sharpness of outline, color, and effect.

I am aware that ink-powders have been formed of extract of logwood, bichromate of potash, and prussiate of potash; also, that these ingredients have been sometimes mixed with gum arabic and copperas.

Having thus fully described my invention, I claim as new and desire to secure by Letters Patent—

The herein-described composition of matter for use as a fluid ink, consisting of albumen, bichromate of an alkali—such as soda, ammonia, or potash—ferrocyanide of potash, a suitable coloring-matter, and water sufficient to secure proper fluidity, the said ingredients compounded substantially as herein set forth.

JEAN JACQUES MAGNE.

Witnesses:
   ROBT. M. HOOPER,
   JEAN BAPTISTE ROLLAND.